Sept. 9, 1969  W. G. VON MEYER  3,465,516
TIMING DEVICE
Filed March 25, 1968
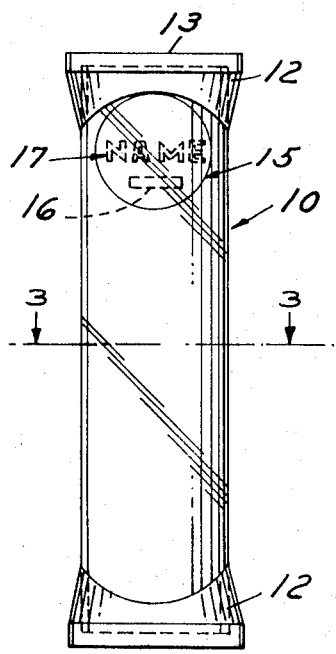
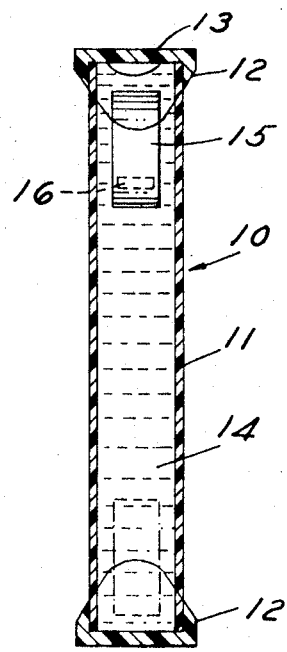
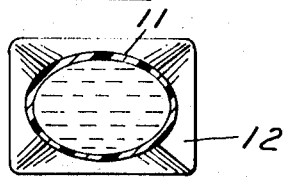
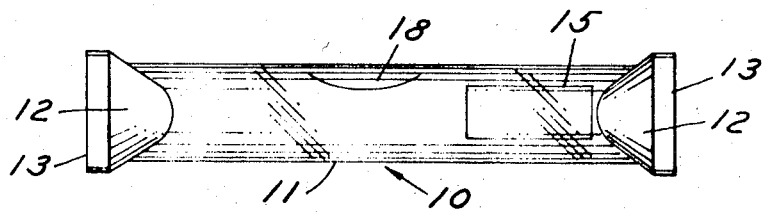
INVENTOR
WALTER G. VON MEYER
BY
Barnes, Kisselle, Raisch & Choate
ATTORNEYS

United States Patent Office 3,465,516
Patented Sept. 9, 1969

3,465,516
TIMING DEVICE
Walter G. Von Meyer, 1504 Port Jefferson Road,
Sidney, Ohio 45365
Filed Mar. 25, 1968, Ser. No. 715,654
Int. Cl. G04f 1/06
U.S. Cl. 58—144          6 Claims

ABSTRACT OF THE DISCLOSURE

A timing device comprising a transparent tube having end caps for supporting the tube in either upright or inverted positions. The tube is filled with a liquid and a float member is provided in the tube. The float member has indicia means thereon and is proportioned and weight such that when the timing device is inverted, the indicia means rotates and is always readable.

This invention relates to timing devices.

Among the objects of the invention are to provide a low cost timing device which has an automatically rotatable float member with indicia means such as advertising thereon that is always in upright readable position regardless of the upright or inverted position of the timing device; which is low in cost; simple in design and attractive in appearance.

In the drawings:

FIG. 1 is a front elevational view of a timing device embodying the invention.

FIG. 2 is a vertical sectional view of the timing device shown in FIG. 1.

FIG. 3 is a sectional view taken along the line 3—3 in FIG. 1.

FIG. 4 is a view of the device shown in FIG. 1 when it is used as a level.

Referring to the drawings, the timing device 10 embodying the invention comprises a plastic tube 11 which is oval in cross section and end caps 12 of plastic sealed to the ends of the tube. The end caps have flat surfaces 13 that serve to support the timing device in upright and inverted positions.

The timing device is substantially filled with a liquid 14, leaving a small air bubble 18, and a float 15 is provided in the device. The float 15 is generally circular and preferably of uniform thickness and includes a weight 16 in the lower end thereof. Indicia 17 such as advertising are provided on one or both surfaces of the float.

The distribution of weight of the float results in the tendency of the float to always remain in position such that the indicia 17 is always readable.

Thus with the float at the upper end as shown in FIGS. 1 and 2, when the timing device 10 is inverted by rotating, the float will then be at the bottom of the device. The float will then begin to rise and during the rising motion the weight 16 will cause the float to rotate bringing the indicia 17 into upright readable position.

The tube of the timing device may be made of any suitable transparent plastic such as cellulose acetate or cellulose butyrate. The liquid 14 may be transparent, such as silicone fluid. The float may also be made of any suitable plastic such as Delrin, Celcon or polyethylene. The viscosity of the liquid 14 and the density of the float may be proportioned to control the length of time the float rises or moves from one end of the tube to the other.

It will thus be seen that each time the timing device is used, the whole unit will have to be turned end for end, and as the user sets the timing device down on one of the bases 13, the float carrying the advertising indicia will be automatically rotated, thus drawing the user's attention to the advertising matter appearing on the float. The purpose of not completely filling the timer with liquid, and leaving a small bubble 18, is to permit the device to be used as a level in addition to its function as a timer.

I claim:

1. In a timing device, the combination comprising
   a container having at least a portion of one wall thereof which is transparent,
   said container being non-circular in cross section and closed and completely sealed,
   a liquid filling said container,
   means for supporting said container with its longest dimension extending vertically in upright and inverted positions,
   and a float member within said container,
   the internal shape of said container being such as to guide the float whereby its plane of movement in the container remains the same,
   said float member having at least one surface cooperating with an internal surface of the container for effecting guiding of the float and being of a material having different density than that of the liquid,
   said float member having indicia means thereon, the size, shape and weight distribution of said float member being such that the float and indicia means is automatically rotatable and extends in visible, readable position in both the upright and inverted positions of the container.

2. The combination set forth in claim 1 wherein said container comprises an elongated tube.

3. The combination set forth in claim 2 wherein said means for supporting said container comprises flat closure members on the ends of said tubes.

4. The combination set forth in claim 2 wherein said tube has an oval cross section.

5. The combination set forth in claim 1 wherein said liquid substantially fills said container leaving a small bubble of air to permit the device to be used as a liquid level.

6. The combination set forth in claim 2 wherein said tube is made of transparent plastic material.

References Cited

UNITED STATES PATENTS

| 552,134 | 12/1895 | Miller | 40—310 |
| 3,025,665 | 3/1962 | Dock et al. | 58—144 |

RICHARD B. WILKINSON, Primary Examiner

EDITH C. SIMMONS, Assistant Examiner

U.S. Cl. X.R.

40—310